INVENTOR.
ROGER K. LEE AND
CLARK A. TEA.
BY
ATTORNEYS

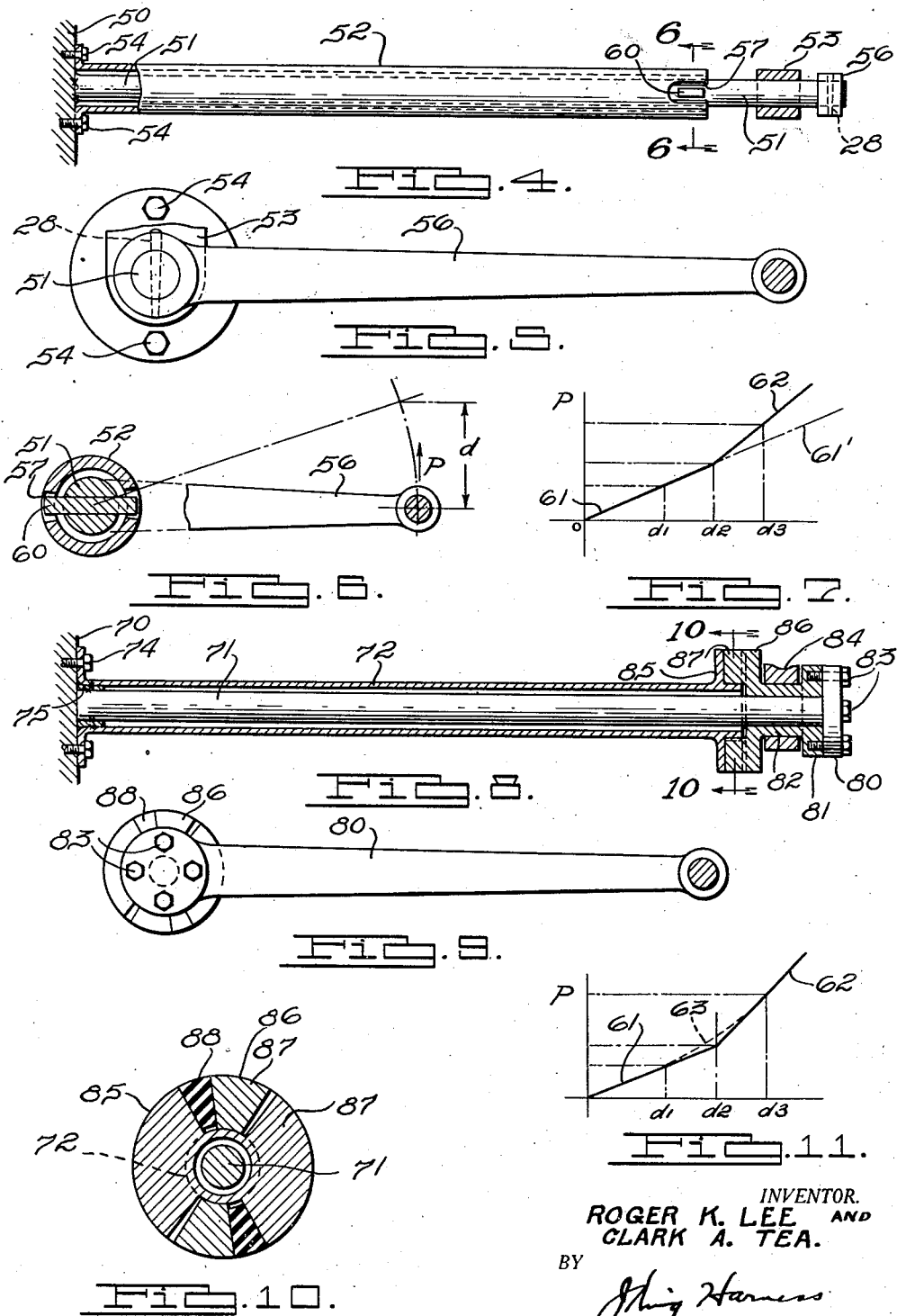

Patented Sept. 19, 1939

2,173,652

UNITED STATES PATENT OFFICE 2,173,652

VEHICLE SPRING SUSPENSION

Roger K. Lee, Highland Park, and Clark A. Tea, Detroit, Mich., assignors to Chrysler Corporation, Detroit, Mich., a corporation of Delaware Application May 31, 1933, Serial No. 673,709

12 Claims. (Cl. 267—57)

This invention relates to motor vehicles, and more especially to the spring suspension system thereof.

The principal object of the invention is to provide an improved spring suspension system for motor vehicles.

Another object is to reduce to a minimum the unsprung weight of a motor vehicle.

Another object is to precondition a spring suspension system of a motor for different loads.

Another object is to provide a spring suspension system for motor vehicles which prevents pitching of the vehicle body regardless of the load distribution therein.

Another object is to provide a spring suspension system wherein a deflection of the front springs causes a corresponding deflection in the same direction of the rear springs of the vehicles.

Another object is to provide a spring suspension system in which the resistance to spring deflection is increased at a greater rate as the springs are deflected beyond a predetermined point.

Another object is to provide a spring suspension system in which there is a gradual transition from one rate of increase of resistance to spring deflection to a greater rate of increase of resistance to spring deflection as the deflection of the springs is increased.

Other objects and advantages will become apparent from the following description and appended claims.

For the purpose of illustrating the genus of the invention, typical concrete embodiments thereof are shown in the accompanying drawings in which:

Fig. 4 is an elevation with parts broken away and in section of another embodiment of spring suspension means according to this invention;

Fig. 5 is an end view of parts shown in Fig. 4;

Fig. 6 is a view similar to Fig. 5, with parts broken away to show a section taken on the line 6—6 of Fig. 4, construction lines being shown to indicate the position of parts during the deflection of the springs and the direction of application of a force producing such deflection;

Fig. 7 is a diagram showing the relation of the deflection and resistance to deflection of the springs, shown in Figs. 4, 5 and 6;

Fig. 8 is a central longitudinal section of a further modification of spring suspension means constructed in accordance with this invention;

Fig. 9 is an end view of parts shown in Fig. 8;

Fig. 10 is a section taken on the line 10—10 of Fig. 8; and

Fig. 11 is a diagram similar to that shown in Fig. 7 but additionally illustrating the relation of the deflection and resistance to deflection of the spring suspension means shown in Figs. 8, 9 and 10.

Figure 1:
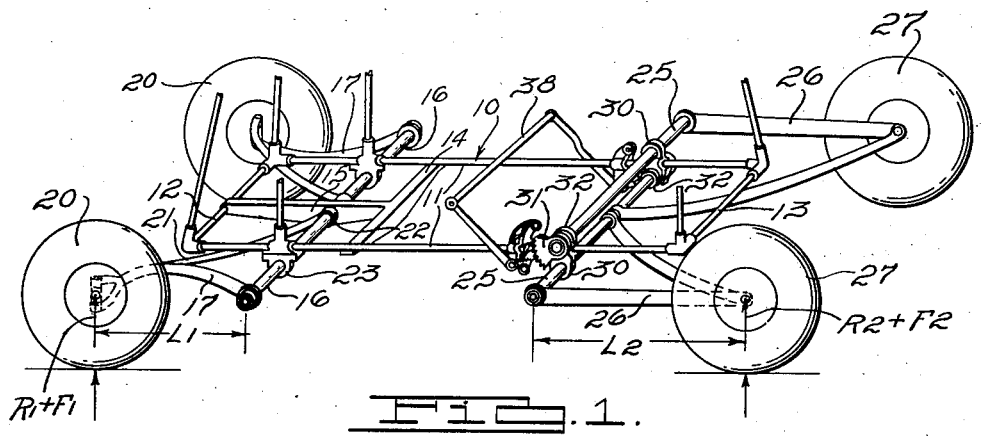
Figure 1 is a perspective, more or less diagrammatic in form, of the arrangement of front and rear springs of a motor vehicle constructed in accordance with this invention.
Figure 2:
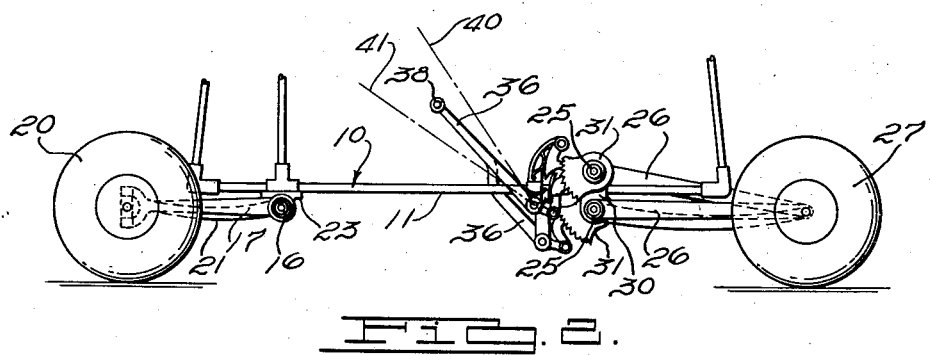
Fig. 2 is a side elevation of the construction shown in Fig. 1.
Figure 3:
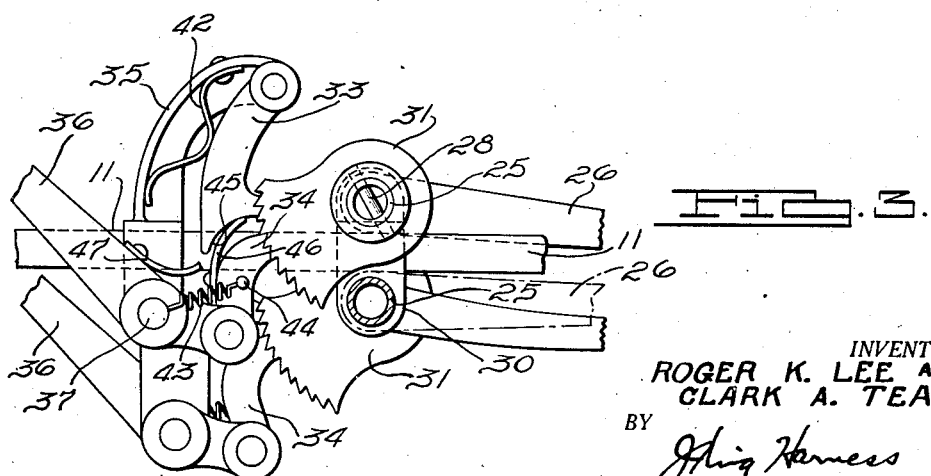
Fig. 3 is an enlarged view in side elevation of parts shown in Figs. 1 and 2.

Referring to Figs. 1, 2 and 3 of the drawings, one of the spring suspension means according to this invention is illustrated. In this embodiment the numeral 10 designates the frame of the motor vehicle, which frame may be a more or less conventional type of chassis frame but preferably constitutes a combined chassis and body frame of the vehicle, as illustrated. The frame 10 includes a pair of side sills 11, and front and rear cross members designated as 12 and 13 respectively. An intermediate cross member 14 extends transversely of the frame and is connected to the side sills 11. A support member 15 extends longitudinally of the frame 10 and its ends are connected to the central portions of the cross members 12 and 14. The inner ends of a pair of torsionally yieldable members 16 are welded or otherwise secured to the supporting member 15, the torsionally yieldable members 16 extending transversely of the frame 10 to points beyond the side sill 11. A pair of arms 17 are secured to the outer ends of the torsionally yieldable members 16 and extend forwardly of the frame 10 in a generally horizontal direction when supporting the vehicle and load. To the forward ends of the arms 17 are pivoted the steering knuckles of the front wheels 20. The arms 17 are bowed inwardly to permit steering of the wheels 20 and preferably are provided with brace members 21 extending from a point adjacent the pivotal connection to the steering knuckles to a point adjacent the connection of the torsional members 16 to the support member 15. The rearwardly disposed ends of the brace members 21 are journaled on the torsionally yieldable members 16 and retained in position on the yieldable members by means of the support member 15 and collar member 22 locked to the torsionally yieldable members 16. The torsionally members 16 may be of any desired cross section although preferably cylindrical, and may be of tubular or solid formation. Bearing members 23 are secured to the bottom portion of the side sills 11 and afford bearings for the torsionally yieldable members 16 at points intermediate their lengths.

At the rear portion of the frame 10 a pair of torsionally yieldable members 25 are provided, each being fixed at one end to a side sill of the frame 10 and extending to a bearing secured to the opposite side sill and beyond the latter sill to an arm 26 secured on the end of the yieldable member, as by means of a pin 28. Wheels 27 are journaled upon the rear ends of the arms 26. Both the torsionally yieldable members 25 and the arms 26 are made of greater length than the yieldable members 16 and arms 17 employed at the front end of the vehicle. This causes the rear spring means to exert less torsional resistance to deflection relative to the rear wheels of the vehicle than that afforded by the front spring means relative to the front wheels. Both the lengthening of the torsionally yieldable members and the lengthening of the arms decrease the stiffness of the spring suspension means relative to the wheels of the vehicle so that either or both expedients may be employed, preferably both, as illustrated.

Referring to Fig. 1 it will be noted that the effective length of the arms 17 and 26 are designated L1 and L2 respectively, and the resultant forces acting in a vertical direction upon the axes of the front and rear wheels are designated R1 plus F1 and R2 plus F2, respectively. When the front wheels strike a bump, the moment of forces acting upon the springs 16 will be (R1+F1) L1, and the balancing moments of forces acting upon the spring 25 will be (R2+F2) L2, and these moments will be equal. Since the stiffness of the tension spring 25 is much less than that of the spring 16, and the length of the arm L2 is greater than that of the arm L1, the rear end of the vehicle will be depressed upon depression of the front end of the vehicle for the moments to balance. Thus, if the front end of the vehicle at the bearings 23 is moved up and down, the body will not rotate about its center of gravity or about the axis of either spring; but the body, as a whole, will move more or less vertically due to the reaction of relatively stiff front springs on relatively less torsionally resistant rear springs. If, however, the rear wheels of the vehicle encounter bumps the action of the relatively weak rear springs will have little effect on the action of the relatively stiff front springs, the rear end of the body being moved up and down and rotating about a point near the bearing 23. This difference in the reaction of the front and rear springs as the front and rear wheels respectively encounter uneven road surfaces precludes the possibility of pitching of a vehicle body regardless of the weight distribution therein.

In the design of a five-passenger automotive vehicle it is extremely difficult to select the proper spring suspension means which will afford the desired riding qualities both when the vehicle carries one and five passengers. This is especially true in the case of a light vehicle in which the variation in loads between one and five passengers may be substantially equal to the weight of the vehicle. In the present construction provision is made for preconditioning the spring suspension system for different loads. Since the variable load of an automotive vehicle is carried principally by the rear springs, the present construction makes provision for rotatively adjusting the fixed ends of the torsionally yieldable members 25. This may be effected by providing a pair of supports 30 clamped or otherwise secured to the side sills 11 of the frame 10, the upper portion of the supports 30 providing bearings for the upper spring member 25 and the lower portion, bearings for the lower spring member 25. Ratchet segments 31 are fixed to the ends of the spring members 25 and are engageable with means for rotating the spring members to the desired adjusted position. It is preferred to arrange the spring members 25 one above the other, to permit the arms 26 to be of approximately equal lengths. To prevent endwise displacement of the yieldable members 25 relative to the supports 30 a collar 32 may be fixed thereto upon the opposite side of the bearing afforded by the support member 30 from each ratchet member 31.

The operating means for the ratchet member 31 preferably comprises a pair of pawls 33 and 34, the pawl 33 being a holding pawl and pivoted to a support member 35 clamped to a side sill 11 and 34 being an operating pawl pivotally connected to the end of an operating lever 36 which in turn is pivoted to the support member 35 by a pivot pin 37. The ratchet operating mechanism is adapted to rotate the ratchet 31 in a clockwise direction and in a step-by-step manner upon oscillation of the operating lever 36 between the position indicated in full lines in Figs. 1, 2 and 3 and the position indicated by dot-and-dash line 40 of Fig. 2. Rotation of the ratchet members 31 in a clockwise direction will rotate the arm 26 in a corresponding direction when the load in the vehicle remains unchanged and will permit the arm 26 to remain in a substantially horizontal position upon deflection of the yieldable members 25 as the load in the vehicle is increased. Oscillation of the operating lever 36 between the position indicated in full lines and the position indicated by dot-and-dash line 41 in Fig. 2 will permit counter-clockwise rotation of the ratchet member 31 in a step-by-step manner under the influence of the load of the body and chassis of the vehicle relative to the wheels 27.

In the ratchet operating mechanism the holding pawl 33 is normally biased into engagement with the teeth of a ratchet segment 31 by means of a spring 42 secured to the support member 35. A light coil spring 43 is arranged in tensioned condition between the pivot pin 37 for the operating lever 36, and a laterally extending lug 44 provided on the side of the operating pawl 34. The spring 43 normally tends to keep the pawl 34 out of engagement with the teeth of the ratchet segment 31. The holding pawl 33 is provided with a cam surface 45 so arranged that an end thrust upon the pawl 33 will tend to disengage the pawl from the ratchet segment 31. A leaf spring 46 is secured to the upper surface of the operating pawl 34 and is adapted upon rotation of the operating lever 36 in a counter-clockwise direction to impart an end thrust against the cammed surface 45 of the holding pawl. The spring 46 is of sufficient strength to overcome at certain times the biasing action of the spring 42 to disengage the holding pawl 33 from the teeth of the ratchet segment 31. A leaf spring 47 is secured to the upper surface of the operating lever 36 at a point adjacent the pivot 37 and extends to a point adjacent the upper surface of the spring 46 when the parts are in the position indicated in full line in Figs. 1, 2 and 3. The spring 47 is made of sufficient strength to overcome the biasing action of the coil spring 43 and engages the upper surface of the leaf spring 46 as the operating lever 36 is rotated in a clockwise direction to yieldably urge the operating pawl 34 into engagement with the teeth of the ratchet segment 31. The operating levers 36 of the ratchet operating mechanism extend upwardly into the body of the vehicle and the upper ends are connected by a cross member 38 which may afford a foot rail for the rear compartment of the vehicle body.

In the operation of the ratchet operating mechanism the ratchet segments 31 may be rotated in a clockwise direction in a step-by-step manner by oscillating the lever 36 between the full lined position and that indicated by the dot-and-dash line 40 of Fig. 2, as previously indicated. During this operation the spring 46 is separated from contact with the cammed surface 45 so that the spring 42 can yieldably maintain the holding pawl 33 in contact with the teeth of segment 31 while at the same time the spring 47 engages the upper surface of spring 46 and overcomes the biasing action of the coil spring 43 to maintain the operating pawl yieldably in engagement with the teeth of the segment 31. During this operation no elements of the mechanism function to separate the holding and operating pawls from the teeth of the ratchet segments so that the operating pawl successively picks up teeth of the segment 31 and advances the segment in a clockwise direction to such a point that the holding pawl may retain the segments in position while the operating pawl picks up the next successive tooth.

In the operation of the segment actuating mechanism to lower the rear portion of the body relative to the wheels 27, the operating handle 36, as previously indicated, is oscillated between the full lined position and the position indicated by the dot-and-dash line 41 in Fig. 2, which operation of the lever 36 toward the dot-and-dash line 41 first brings the spring 46 into engagement with the cammed surface 45 to force the teeth of the operating pawl 34 into engagement with the teeth of the ratchet segment 31. The spring 47 is not in engagement with the spring 46 at this time and the spring 46 is of sufficient strength to overcome the biasing action of the spring 43 but cannot move the holding pawl 33 away from the teeth since the load of the vehicle body at this time is carried by the holding pawl and frictional engagement between the teeth of the holding pawl and the segment maintains the holding pawl in engagement with the ratchet segment until the teeth of the operating pawl 34 pick up the load. As the load is picked up by the operating pawl, the spring 46 co-operates with the cammed surface 45 to move the holding pawl 33 out of engagement with the teeth of the ratchet segment, the spring 46 overcoming the biasing action of the spring 42 at this time. As the operating lever 36 moves from the position indicated by the dot-and-dash lines 41 toward the full-line position, as indicated in Fig. 2, the operating pawl 34 moves away from the holding pawl 33 withdrawing the spring 46 but holding the holding pawl 33 out of engagement with the ratchet segment 31 until the teeth thereof have passed the points of the teeth which were previously held thereby until the spring 46 is so far out of engagement with the holding pawl 33 that the spring 42 may return the holding pawl into engagement with the next successive teeth above those previously held as indicated in Fig. 3. As the spring 46 is moved out of engagement with the cammed surface 45 of the holding pawl, the spring 43 retracts the operating pawl 34 from engagement with the teeth of the ratchet segment as the holding pawl assumes the load. As the operating handle 36 is again rotated in a counterclockwise direction from the full-lined position to the position indicated by the dot-and-dash line 41, the coil spring 43 maintains the operating pawl 34 out of engagement with the ratchet segment until the teeth of the operating pawl have passed the teeth of the ratchet segment previously held thereby until such time as the spring 46 again engages the cammed surface 45 forcing the teeth of the operating pawl into engagement with the next successive teeth of the ratchet segment above those previously held. Continued oscillation of the operating lever 36 causes the operating pawl 34 to again pick up the load and cause the release of the holding pawl until a tooth of the ratchet segment has passed the same whereupon the holding pawl again picks up the load. In this manner the operating lever 36 may be oscillated between the limits indicated to either raise or lower the rear portion of the vehicle relative to the wheels to compensate for the torsional deflection of the yieldable member 25 so that the arm 26 may be maintained in substantially horizontal position for variable loads disposed in the body of the vehicle.

Referring particularly to Figs. 4 to 7 inclusive, another embodiment of spring means is disclosed which may be employed in place of the spring means indicated at 15 or 25 of the previously described embodiments. Referring to the construction shown in Figs. 4 to 6 inclusive, a support 50 is shown indicative of a support such as 15 or 11 of the previously described embodiments, to which is secured one end of a solid cylindrical and torsionally yieldable member 51. An arm 56 is secured to the outer end of the torsionally yieldable member 51 by means of a pin 28. A bearing 53 supports the outer end of the yieldable member 51 in the same manner as do the bearings 23 and 30 of the previous embodiment. A second tubular member 52 is secured at one end to the support 50 as by means of the bolts 54 and surrounds the torsionally yieldable member 51 through a major portion of its length. The torsionally yieldable member 52 is provided with a slot 57 adjacent its outer end which is adapted to cooperate with lug 60 when the torsional deflection of the yieldable member 51 has reached a certain value. The sides of the slot 57 are spaced from the lug 60 so that the torsionally yieldable member 51 may be deflected to a certain extent without the lug 60 engaging the sides of the slot 57 but continued deflection thereafter causes the yieldable member 51 to pick up the yieldable member 52 so that both yieldable members from that point resist torsional deflection. Referring to Fig. 6, the deflection produced by a force $p$ applied to the end of the arm 56, that is at the point of connection to the wheels of the vehicle, gives the effective vertical distance of travel of the axes of the wheels, as indicated by $d$. Since the deflection is proportional to the force applied, to the square of the length of the arm 56 and to the length of the torsionally yieldable member and inversely proportional to the modulus of elasticity for torsion of the material composing the torsionally yieldable members, and inversely proportional to the fourth power of the diameter of the torsionally yieldable member; the stiffness of the springs may be controlled by the selection of material making up the torsionally yieldable members, by varying the length of the yieldable members or the arm 56 or by varying the cross-sectional area of the yieldable members. Thus, in the first embodiment the front springs are made of approximately half the length of the rear spring and the arms 17 are made of less length than the arms 26 so as to provide stiffer springs at the front end of the vehicle than at the rear end.

Referring to Fig. 7 of the drawings, there is shown a diagram in which values of the deflection are plotted along the abscissa and values of the force or load producing such deflection are plotted along the ordinate of the diagram. The value of deflection $d1$ designates the deflection produced by the vehicle body with no contained load, $d2$ the deflection with two passengers in the vehicle and $d3$ with four passengers in the vehicle. In the absence of any positive connection between the torsionally yieldable members 51 and 52 such as the lug 60, the relation between deflection and force producing such deflection would be represented by a straight line such as 61, 61'. With the torsionally yieldable members 51 and 52 connected as by the lug 60, the rate of resistance to torsional deflection increases at a greater rate as indicated by the line 62. Thus in the spring construction disclosed in Figs. 5 to 6 inclusive the torsionally yieldable member 52 increases the rate of resistance to deflection as the spring is deflected beyond a predetermined point.

Referring to Figs. 8, 9 and 10, a slightly modified form of construction of the spring means disclosed in Figs. 4 to 6 inclusive is illustrated. In this embodiment a tubular and torsionally yieldable member 72 is secured to a support 70 by means of bolts 74. The tubular member 72 has welded thereto a sleeve member 75 which is welded in turn to a torsionally yieldable member 71 which is enclosed by and extends slightly beyond the end of the tubular member 72. The free end of the torsionally yieldable member 71 is secured to the end of an arm 80 corresponding to arms 17, 26 and 56 of previous embodiments and which is secured to a flange 81 integral with a sleeve member 82 by means of bolts 83. The free end of the torsionally yieldable member 72 is provided with a disc-like enlargement 85. The inner end of the sleeve member 82 is provided with a similar disc-like enlargement and the enlargements 85 and 86 are provided with cooperating spector-shaped lugs 87 which through the intermediary of spector-shaped lugs 88 of rubber or other yieldable material are adapted to cause a deflection of the yieldable member 72 upon the deflection of the yieldable member 71 beyond a predetermined point. A bearing 84, corresponding to the bearings 23, 30 and 53 of the previous embodiments, is provided for the yieldable member 71 at a point adjacent its free end and in the present instance surrounds the sleeve 82.

Referring to Fig. 11, the relation between load and deflection is diagrammatically illustrated in the same manner as in Fig. 7. In the absence of the block 88 of yieldable material interposed between the cooperable lugs 87 which are fixed respectively relative to the yieldable members 71 and 72, the relation of deflection to resistance to deflection of the yieldable member 71 would be represented by the straight line 61 for deflections up to that represented by $d2$, at which point the tubular member 72 would be picked up and from then on the relation of deflection to resistance to deflection of both tubular members 71 and 72 would be represented by the line 62 of Fig. 11. During operation of the vehicle deflection of a value approximately that represented by $d2$ would cause engagement and disengagement of the lugs 87 and render the action of the spring disagreeable and uncomfortable to occupants of the vehicle. By interposing the resilient block between the lugs 87, the tubular yieldable member is picked up earlier and the rate of increase of resistance to torsional deflection of the combined springs is represented by the dotted line 63. By providing the yieldable block 88 the rate of change of resistance to torsional deflection of the spring is gradually varied from that of the yieldable member 71 alone to that of the combined yieldable members 71 and 72 thus smoothing out the action of the spring.

As many changes could be made in the above construction and many apparently different embodiments of this invention could be made without departing from the scope thereof, it is intended that all matter contained in the above description or shown in the accompanying drawings shall be interpreted as illustrative and not in a limiting sense.

What we claim is:

1. In a motor vehicle including a frame and pairs of front and rear wheels for supporting said frame, the combination of torsionally yieldable members for each wheel, each member being non-rotatably secured at one end to said frame and rotatably connected at a point intermediate their length to said frame, an arm fixed at one end to each torsionally yieldable member and rotatably connected to one of the wheels at the other end, the resistance to torsion of the yieldable members connected to the rear wheels being less than that of the yieldable members connected to the front wheels.

2. In a motor vehicle including a frame and pairs of front and rear wheels for supporting said frame, the combination of torsional yieldable members for each wheel, each yieldable member being non-rotatably secured at one end to said frame and rotatably connected at a point intermediate its length to said frame, an arm fixed at one end to each torsionally yieldable member and rotatably connected to one of the wheels at the other end, the length of the arm connected to the rear wheels being greater than that of the arm connected to the front wheels.

3. In a motor vehicle including a frame and a wheel, the combination of a spring suspension means interconnecting said frame and wheel comprising a torsionally yieldable member fixed at one end to said frame, bearing means on said frame for journaling said yieldable member at a point remote from the fixed end thereof, an arm fixed at one end to said yieldable member and arranged substantially normal to the latter, the other end of said arm being rotatably connected to said wheel, and means for increasing the torsional resistance of said yieldable member at a more rapid rate after the latter has been deflected beyond a predetermined point.

4. In a motor vehicle including a frame and a wheel, the combination of a spring suspension means interconnecting said frame and wheel comprising a torsionally yieldable member fixed at one end to said frame, bearing means on said frame for journaling said yieldable member at a point remote from said fixed end thereof, an arm fixed at one end to said yieldable member and arranged substantially normal to the latter, the other end of said arm being rotatably connected to said wheel, a tubular and torsionally yieldable member disposed on said first-named yieldable member and fixed to said frame at the end disposed adjacent the fixed end of the first-named yieldable member, and means arranged adjacent the opposite end of the first-named member for engaging the opposite end of the tubular member after the first-named member has been deflected beyond a predetermined point and thereafter to cause deflection of the tubular member upon continued deflection of the first-named member.

5. In a motor vehicle including a frame and a wheel, the combination of a spring suspension means interconnecting said frame and wheel comprising a torsionally yieldable member fixed at one end to said frame, bearing means on said frame for journaling said yieldable member at a point remote from the fixed end thereof, an arm arranged substantially normal to the yieldable member and fixed at one end to the latter, the other end of said arm rotatably supporting said wheel thereon, means for increasing the rate of resistance to torsional deflection as said yieldable member is deflected beyond a predetermined point, and means for effecting a gradual change from one rate of increase of resistance to torsional deflection to the other rate of increase of resistance to torsional deflection.

6. In a motor vehicle including a frame and a pair of wheels, the combination of a spring suspension means interconnecting said frame and wheels and comprising two torsionally yieldable members, a pair of arms each connected at one end to one of said members and rotatably connected at the other end to a wheel, and means for simultaneously and adjustably fixing one end of each of said yieldable members to said frame to vary the resilient action of said members.

7. In a motor vehicle including a frame and a wheel, the combination of a spring suspension means interconnecting said frame and wheel and comprising a pair of torsionally yieldable members each fixed at one end to said frame, an arm fixed at one end to an end of one of said members and rotatably connected to said wheel at its other end, lugs fixed to each of said members for rendering one effective only after a predetermined deflection of the other, and a rubber block interposed between said lugs for causing a gradual change in the rate of resistance to deflection from that of one member to that of both members.

8. In a motor vehicle including a frame and a wheel, the combination of a spring suspension means interconnecting said frame and wheel and comprising a torsionally yieldable member extending transversely of and fixed at one end to said frame, and a wheel support including an arm fixed at one end to the other end of said member and rotatably connected to said wheel at the other end and including means in engagement with said member for holding the end of said arm connected to the wheel from deflection relative to the fixed end of said torsionally yieldable member.

9. In a motor vehicle including a frame and wheel, the combination of a spring suspension means interconnecting said frame and wheel and comprising a torsionally yieldable member fixed at one end to said frame, an arm fixed at one end to the other end of said torsionally yieldable member and rotatably connected at its other end to said wheel, and a second arm fixed at one end to said torsionally yieldable member at a point spaced from said other end thereof and fixed to said first named arm adjacent said wheel for holding the interconnected ends of said arms against deflection relative to the fixed end of said torsionally yieldable members.

10. In a motor vehicle including a frame and a pair of laterally spaced wheels, the combination with a pair of spring suspension means, each including a torsionally yieldable bar extending laterally of said vehicle and fixed at one end to said frame, bearing means on said frame for independently journaling each yieldable member respectively at a point remote from its fixed end, a wheel support on each of said bars including a pair of converging arms having one of their non-adjacent ends journaled on the fixed end portion of one of said bars and the other of their non-adjacent ends fixed to the opposite ends thereof respectively, and a wheel spindle on the adjacent ends of the converging arms of each wheel support.

11. In a motor vehicle including a frame and a pair of spaced wheels, the combination with a pair of spring suspension means including a pair of torsionally yieldable members extending laterally of said vehicle and fixed at one end to said frame, bearing means on said frame for independently journaling each yieldable member respectively at a point remote from its fixed end, a wheel support on each of said members including a pair of converging arms having one of their non-adjacent ends fixed on one of said members and the other of their non-adjacent ends journaled on said member spaced from said bearing means, and a wheel spindle on the adjacent ends of the converging arms of each wheel support.

12. In a motor vehicle chassis including a wheel, a frame, a torsionally yieldable member extending laterally of said frame and having one end fixed thereto, and a wheel support including a pair of arms interconnecting said frame and wheel and having their adjacent ends rotatably connected with said wheel and their non-adjacent ends connected with said member.

ROGER K. LEE.
CLARK A. TEA.